M. W. MARSDEN.
SYSTEM OF DEVELOPING NATURAL POWER FOR INDUSTRIAL PURPOSES.
APPLICATION FILED JULY 17, 1911.
1,036,502.
Patented Aug. 20, 1912.
2 SHEETS—SHEET 2.
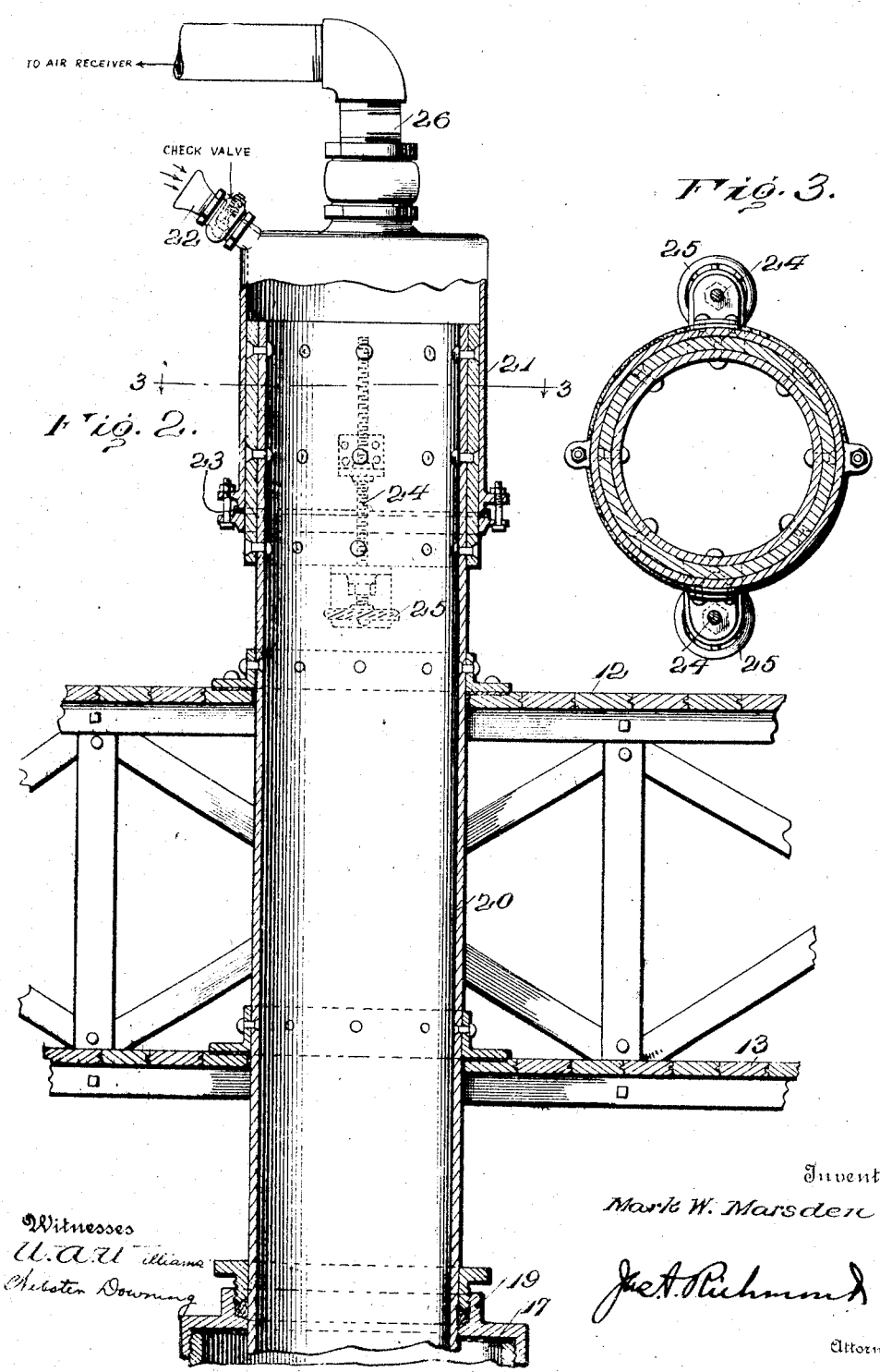

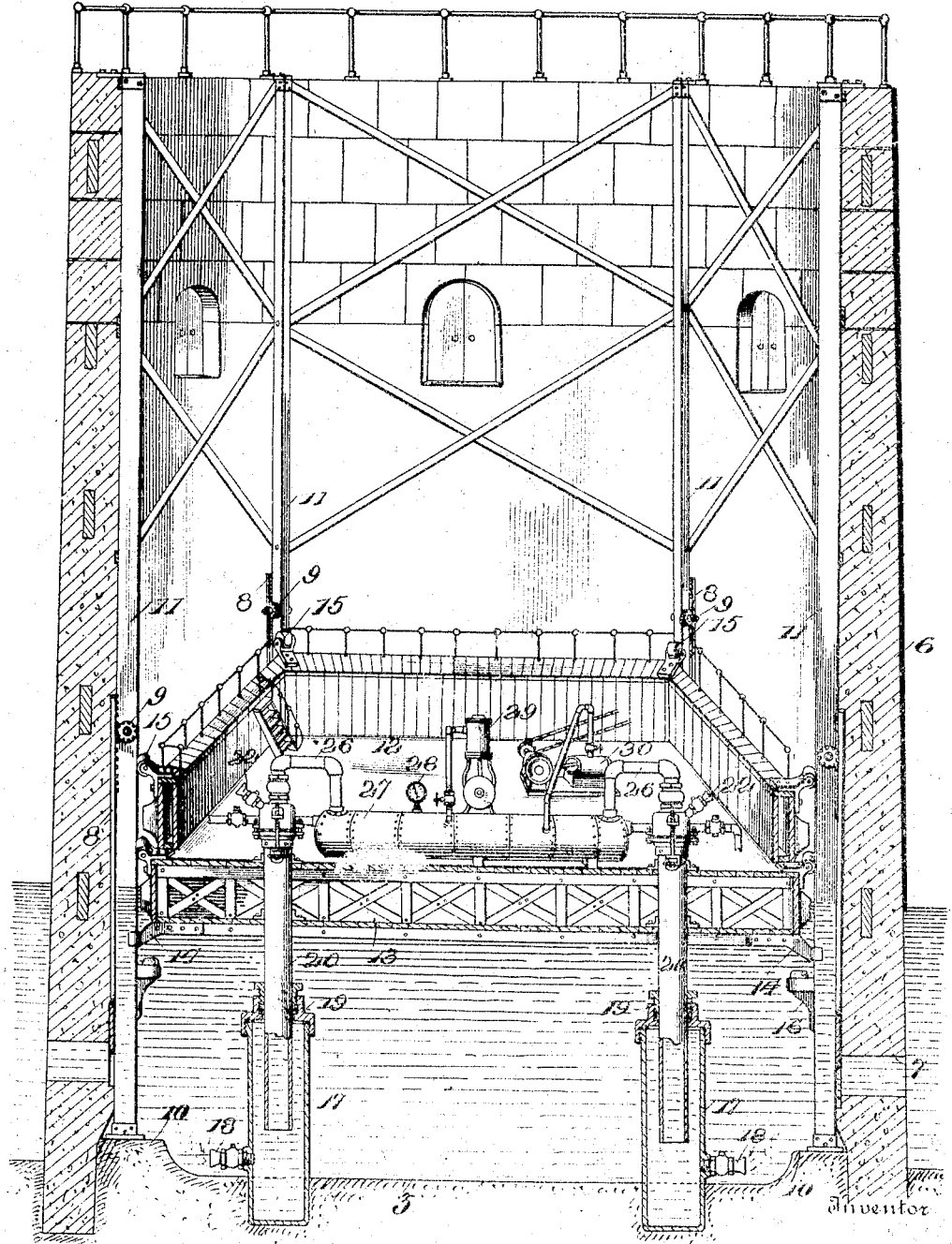

UNITED STATES PATENT OFFICE.

MARK W. MARSDEN, OF PHILADELPHIA, PENNSYLVANIA.

SYSTEM OF DEVELOPING NATURAL POWER FOR INDUSTRIAL PURPOSES.

1,036,502.   Specification of Letters Patent.   Patented Aug. 20, 1912.

Application filed July 17, 1911. Serial No. 638,982.

*To all whom it may concern:*

Be it known that I, MARK W. MARSDEN, a citizen of the United States, residing at Philadelphia, in the county of Philadelphia and State of Pennsylvania, have invented a certain new and useful System of Developing Natural Power for Industrial Purposes, of which the following is a specification.

Heretofore and before my invention it has been proposed to utilize tidal changes, swells, and wave effects for obtaining useful energy, but so far as I am aware none of the devices so proposed has been commercially successful owing to their extremely low efficiency. This is due principally to the fact that mechanical movements were employed which at times operated at high speed and at other times were idle. Otherwise stated the operation was irregular owing to the changing conditions of the water power. The desideratum, therefore, is a plant of the character referred to, the operation of which will be constant and hence high in efficiency.

My invention contemplates this among other things, and more specifically stated it comprehends an air compressor system whereof the compression cylinders are carried by a float and coöperate with water columns which act as pistons or plungers to compress the air.

Other objects, as well as the nature, characteristic features, and scope of the invention will more readily be understood from the following description taken in connection with the accompanying drawings, wherein:

Figure 1, is a sectional elevational view showing the general arrangement of the apparatus. Fig. 2, is a vertical sectional view of one of the air-compression cylinders; and Fig. 3, is a view on the line 3—3 of Fig. 2, more particularly showing the adjusting screws for varying the area of compression.

I erect at some suitable point along the coast, a concrete or other solid and stable foundation 5, which supports a suitable sea wall or break-water 6, within which the machinery is mounted and properly housed and otherwise protected against the action of the elements. There are openings or passages 7, in the wall 6, for the ingress and egress of water, and said openings are equipped with gates 8, which may be operated in any approved manner, for example, by the rack-and-pinion gear 9.

Within the inclosure and mounted on concrete piers 10, and suitably trussed, are a series of beams or posts 11. In this embodiment of the invention, they are four in number, one for each corner of the float for which they constitute guides. The float is composed of a deck 12, and a hull or body 13, therefor, constituted preferably of water-tight compartments which may be filled or emptied of water in the well-known manner, to properly ballast the float. The latter is equipped with arms or slides 14, and with rollers 15, and it will be observed upon reference to Fig. 1, that the posts or guides 11, constitute tracks for said slides and rollers so that the float is free to respond to the rise and fall of the water. Suitable stops or bumpers 16, may be provided in the path of the slides 14, and when present they serve to limit the downward movement of the float.

Below the float and rigidly secured in the concrete foundation 5, are upright cylindrical tanks, shells, or casings 17, whereof the number may vary according to the size and capacity of the plant to be erected. They are provided with water intakes 18, and with stuffing-boxes 19. The water casings 17, constitute one principal factor or element of an air compressor, another principal element being the air compression cylinders 20, which are rigidly secured to the float and telescope the water cylinders 17. Caps 21, are provided for the cylinders 20, and they have air-inlet nozzles 22, equipped with suitably check provisions. Manifestly, as the float rises in response to a rising movement of its fluid support, air will be drawn into the compression cylinder, and will be compressed by the column of water in the cylinder 17, when the float descends.

I propose to provide for regulating the area of compression. This may be accomplished in various ways, but for the sake of illustration, I have shown the caps 21, as telescoping the compression cylinders 20, and equipped with a packing ring 23, and with regulating screws 24 and hand wheels 25, by means of which the caps may be advanced or retracted.

From the compression cylinder, the air passes through a suitable valved connection 26, to a high pressure receiver or reservoir 27, equipped with a pressure indicator 28, and with other necessary adjuncts, and from whence it is supplied to converters or power units 29, 30, etc.

It will be obvious to those skilled in the art to which the invention relates that various changes and modifications may be made without departing from the spirit and scope of the invention. Hence the same is not limited other than required by the state of the prior art.

Having described the nature and objects of the invention, I claim,

1. Means for compressing air, comprising a float responsive to wave motion, cylinders anchored below the float and having water intakes and means to prevent the outflow of water, and compression cylinders secured to the float and telescoping said first mentioned cylinders and equipped with suitable check provisions.

2. Means for compressing air, comprising a float responsive to wave motion, cylinders anchored below the float and having water intakes and means to prevent the outflow of water, compression cylinders secured to the float and telescoping said first mentioned cylinders and equipped with suitable check provisions and means for regulating the area of compression.

3. Means for compressing air, comprising a suitable inclosure or breakwater with means for the ingress and egress of water, a float adapted and arranged to reciprocate therein in response to the rise and fall of water, compression cylinders secured to the float and projecting into the water and having their submerged ends open for the reception of water, means to prevent the outflow of water from said cylinders during the act of compression, a high pressure receiver for relieving said cylinders, and suitable check provisions.

4. An air compressor comprising a breakwater including a variable water column, a cylinder anchored in said column and having a water intake and means to prevent the outflow of water, a compression cylinder telescoping said first mentioned cylinder and having a low pressure inlet and a high pressure outlet, and means for reciprocating said compression cylinder in response to variations of the water column.

5. Means for compressing air, comprising a float responsive to wave motion, a suitable inclosure having guides for the float, cylinders anchored below the float and having water intakes and means to prevent the outflow of water, compression cylinders carried by the float and telescoping and having stuffing-box connection with the submerged cylinders, check provisions for said compression cylinders, means for regulating the area of compression, and a high pressure receiver carried by the float.

In testimony whereof I have hereunto signed my name in the presence of two subscribing witnesses.

MARK W. MARSDEN.

Witnesses:
JAS. A. RICHMOND,
H. A. HEGARTY.